April 1, 1969  F. C. MORRIS  3,435,531
METHOD OF MAKING FREEZER CARTONS AND THE LIKE
AND TEMPLATE THEREFOR
Filed June 24, 1966  Sheet 2 of 2

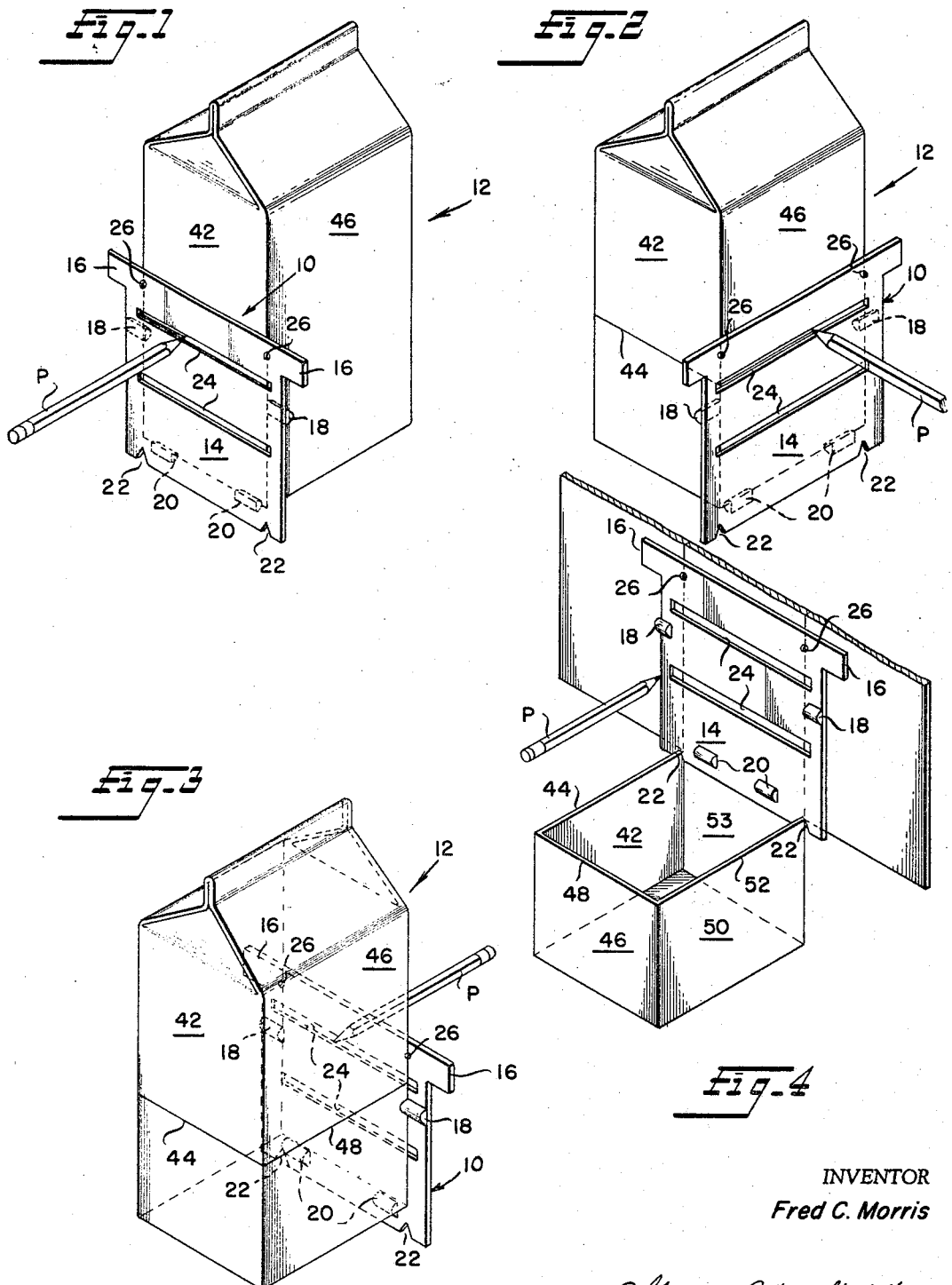

INVENTOR
Fred C. Morris

BY Shlesinger, Arkwright & Garvey
ATTORNEYS

United States Patent Office 3,435,531
Patented Apr. 1, 1969

3,435,531
METHOD OF MAKING FREEZER CARTONS AND THE LIKE AND TEMPLATE THEREFOR
Fred C. Morris, P.O. Box 243,
Blacksburg, Va. 24060
Filed June 24, 1966, Ser. No. 560,319
Int. Cl. B43l *13/00*
U.S. Cl. 33—174     7 Claims

ABSTRACT OF THE DISCLOSURE

A template for forming a small carton from a large carton comprising a T-shaped sheet-like body; said body being in width greater than the width of said carton; means on the body for alining and centering the bottom and the side edges of the large carton; and, means on the body for marking off the height as well as outlining a cover for the small carton.

---

This invention relates to making cartons and a template therefor. More particularly, the invention relates to a method for making refrigerator and freezer cartons or the like from larger milk cartons or the like and a template for same.

With the common use of home freezers and freezing compartments in refrigerators, it is very often necessary to have water and fluid impermeable containers of rather small size. It is often desirable to have these in one-pint or one and one-half pint sizes. While milk customarily may be obtained in wax coated paper containers, these are usually too large for use in storing leftovers and the like since they are of one and two quart sizes. Home freezing of vegetables and fruits requires a large number of small cartons, making the purchase of more expensive containers undesirable.

It is therefore an object of the invention to provide a method and a template for cutting down the size of these containers and forming a cover therefor. This will provide a container which has an easily accessible interior portion. In order to do this it is necessary to modify the conventional folded top portions of the milk carton.

It is another object of the invention to provide a template which can be used when various sized refrigerator containers are desired.

SUMMARY

In one form, the invention comprises a template having a main portion and means located thereon for locating or retaining the main portion relative to a carton to be cut down to refrigerator or freezer-storing size. The main portion of the template includes at least one aperture for facilitating the scoring of the side of the large carton. Another retaining means is provided to facilitate alignment of the template relative to the carton.

By using the above template it is possible to place the template successively on two parallel sides and a connecting side of the carton. The sides of the carton are successively scored by using the aperture of the desired size container. The three sides are cut along the scored lines. The top portion is then spread open by cutting upwardly, tearing or the like preferably at the center of the front portion that part of the container to be discarded, and the template is then placed on parallel sides of the box adjacent the uncut open top portion. The uncut top portion which has been spread open is then scored to form the outline of a cover having top, front and side portions. The template is then removed and the top portion is cut alog the scored lines. After the top has been cut to form the cover, the portion of the carton left is then bent to form front and side portions and are then secured together to provide a cover which will cooperate with the bottom part of the carton to form the completed freezer or refrigerator carton.

These and other objects and advantages of the invention will become more apparent from a study of the remainder of specification taken with the drawings wherein:

FIGURE 1 is a persective view of a milk carton or the like showing the template located on one side thereof;

FIGURE 2 and FIGURE 3 show perspective views of the template on two successive sides of the milk carton;

FIGURE 4 is a perspective view of the carton with the uncut top portion spread open and the template scoring the cover;

DETAILED DESCRIPTION OF THE TEMPLATE

Figures 5, 6:
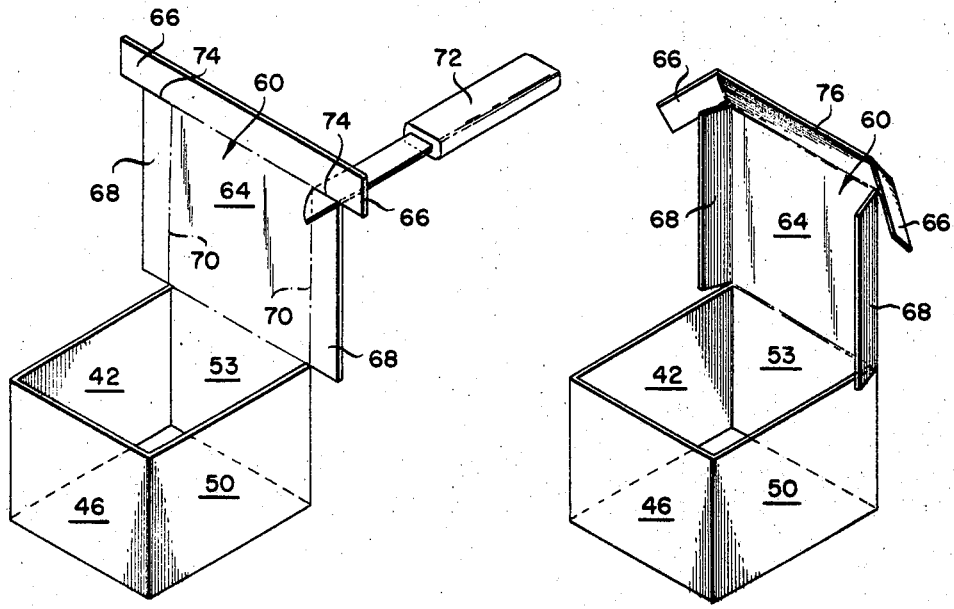
FIGURE 5 is a perspective view of the carton being cut along the scored lines of the cover.
FIGURE 6 is a perspective view of the carton having been cut and in the process of folding the cover portion.

Referring now to the drawings, particularly FIGURES 1–4 and FIGURE 8, a template 10 is seen adjacent a milk carton 12. The template includes a main portion 14 and a pair of wing portions 16 emanating from opposite sides of one end of the main portion. Adjacent the sides edges of the template are a pair of locating or retaining lugs 18 which are preferably substantially triangular in shape having a rounded upper apex. Located adjacent the bottom edge of the template are another pair of similarly shaped locating or retaining lugs 20.

Additional locating or retaining means 22 in the form of notches are located adjacent the edges of the bottom and side of the template.

The template has at least one longitudinal aperture 24 which is located at a point on the template depending upon the size of the carton desired as will be explained below.

Also included are alignment means in the form of apertures 26.

The template is also scored with a pair of parallel lines 28 which emanate from the apex of the notches 22 and extend through the center of the apertures 26 and a line 30 which extends coincident with the lower edges of wings 16 across the portion of the template adjacent the upper end thereof. Lines 28 and 30 intersect at right angles. These lines correspond to the various folds or creases to be made in the cover.

METHOD AND OPERATION

As seen in FIGURE 1, the template 10 is placed along a side 42 of carton 12. The carton is placed so that the bottom edge thereof rests on the upper portion of the lower lugs 20 and between the side lugs 18, thus retaining it relative to the main portion of the template and the slots 24. The lines 28 and the apertures 26 further facilitate in the alignment of the carton relative to the template. The lines 28 will conform to the edge of the carton while the edges will appear in the center of aperatures 26 when properly aligned. A pencil P is used to score a line 44 on side 42 in the appropriate location depending upon the size of the carton wanted. For example, the upper line 44 may conform to a one and one-half pint carton; while if the lower of the two apertures 24 were used, a carton of the size of one pint would be obtained.

Template 10 is then moved to a second side 46 where a line 48 is scribed thereon. Likewise, a third line 52 is scored on side 50 as seen in FIGURE 3. This leaves side 53 unmarked.

A knife or the like is then used to cut along the edges 44, 48, and 52 as seen in FIGURE 4. The top portion is then opened up to provide an uncut top portion which will later be formed into the cover.

As further seen in FIGURE 4, the template is placed on the carton with the notches 22 located on parallel sides of the carton adjacent the uncut top portion which has been folded open. Aperture 26 further facilitates to align the template in that they will coincide with the creases in the opened lid portion, as will the lines 28 which connect the notches 22 and apertures 26. The top portion is then scribed with a pencil along the edges of the template and around the wing portions 16. A scissors or the like may then be used to cut out the cover to the shape seen in FIGURE 5 wherein a cover 60 has a main portion 64 and a pair of wings 66. Side portions 68 of the cover are already creased at 70 since they conform to the creases already in the corners of the carton adjacent the uncut side 53. A knife 72 or scissors may be used to cut the lines at 74 between the edge and creases 70 which will facilitate the bending of the side portions of the cover. The process of folding the cover is seen in FIGURE 6 wherein the portion adjacent the wings 66 is the front of the cover as seen at 76.

Figure 7:
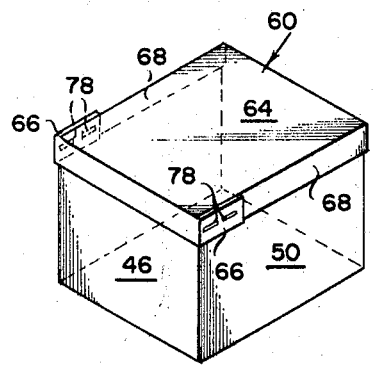
FIGURE 7 is a perspective view of the finished carton having the carton secured.
Figure 8:
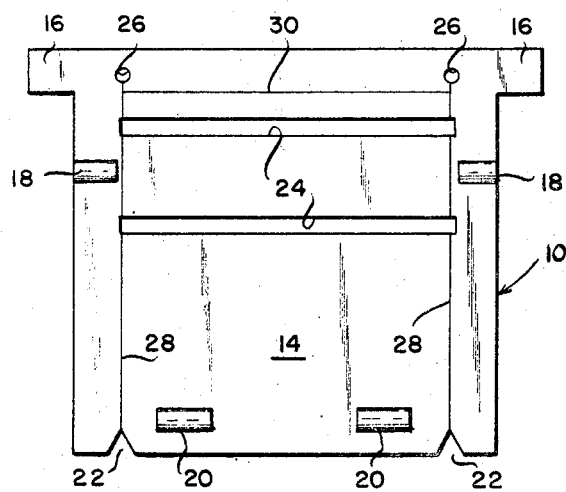
FIGURE 8 is an elevation view of the template of the instant invention.

Securing means 78 such as staples or glue or the like may be used to secure the wings 66 onto the side portions 68. This finished box is seen in FIGURE 7.

While the invention has been described in connection with different embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described my invention what I claim is:

1. A template for forming a small carton from a large carton comprising:
   (a) a T-shaped sheet-like body having bottom, side and top edges,
   (b) said top edges including the crossbar of said T-shaped body,
   (c) the upright of said T-shaped body being in width greater than the width of said cartons,
   (d) means on said body in the area of said bottom edge for aligning the bottom edge of a large carton parallel with the bottom edge of said body,
   (e) lug means along at least one side edge of said body for placing a large carton against for aligning the sides of said carton parallel with the side edges of said body and for centering said large carton on said body,
   (f) means on said body for marking off on the large carton a predetermined height of the small carton to be formed therefrom, and
   (g) means on said body for outlining a cover for the small carton including vertically aligned pairs of spaced openings at the top and bottom edges of said body for indicating the lines of fold for the side flaps of the small carton cover.

2. A template as in claim 1 and wherein:
   (a) said aligning means in the area of said bottom edge includes at least one lug against which the bottom said large carton is placed.

3. A template as in claim 1 and wherein:
   (a) said means for marking off a predetermined height of the small carton to be formed includes a slot parallel to the bottom edge of said body.

4. A template as in claim 1 and wherein:
   (a) said means for marking off a predetermined height of the small carton to be formed includes a series of spaced slots parallel to each other and to the bottom edge of said body.

5. A template as in claim 4 and wherein:
   (a) said slots extend from adjacent one side edge to adjacent the other side edge of said body.

6. A template as in claim 1 and wherein:
   (a) at least one pair of said vertically aligned spaced openings are notches.

7. A template as in claim 1 and wherein:
   (a) at least one pair of said vertically aligned spaced openings are notches and the other pair are perforations.

References Cited

UNITED STATES PATENTS

| | | | |
|---|---|---|---|
| 807,817 | 12/1905 | Gilbert | 33—108 |
| 1,540,991 | 6/1925 | Holmgren | 33—194 |
| 2,653,388 | 9/1953 | Cassady | 33—197 |
| 2,711,587 | 6/1955 | Branman. | |
| 2,795,854 | 6/1957 | Perkal. | |

SAMUEL S. MATTHEWS, *Primary Examiner.*